(12) United States Patent
Fukura et al.

(10) Patent No.: US 6,336,742 B2
(45) Date of Patent: *Jan. 8, 2002

(54) CLINICAL THERMOMETER FOR RECEIVING INFRARED RADIATION FROM A HUMAN EARDRUM

(75) Inventors: Masashi Fukura; Makoto Tabata, both of Kyoto (JP)

(73) Assignee: Omron Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,730

(22) Filed: Aug. 7, 1998

(30) Foreign Application Priority Data

Aug. 8, 1997 (JP) ............................................. 9-214518

(51) Int. Cl.[7] .............................. G01K 1/08; G01J 5/04
(52) U.S. Cl. ........................ 374/121; 374/130; 374/131; 374/158
(58) Field of Search ................................. 374/121, 130, 374/208, 133, 209, 131; 600/474, 549

(56) References Cited

U.S. PATENT DOCUMENTS

| | | | |
|---|---|---|---|
| 4,602,642 A | | 7/1986 | O'Hara et al. ............... 128/664 |
| 4,790,324 A | | 12/1988 | O'Hara et al. ............... 128/664 |
| 4,993,419 A | * | 2/1991 | Pompei et al. ............... 374/121 |
| 5,013,161 A | * | 5/1991 | Zaragoza et al. ............ 374/208 |
| 5,340,215 A | * | 8/1994 | Makita et al. ............... 374/121 |
| 5,358,117 A | * | 10/1994 | Adams ........................ 206/534 |
| 5,487,607 A | * | 1/1996 | Makita et al. ............... 374/121 |
| 5,522,662 A | * | 6/1996 | Shiokawa .................... 374/130 |
| 5,626,139 A | * | 5/1997 | Szeles et al. ................ 374/133 |
| 5,645,350 A | * | 7/1997 | Jang ............................ 374/158 |
| 6,129,673 A | * | 10/2000 | Fraden ........................ 600/549 |
| 6,149,297 A | * | 11/2000 | Beerwerth et al. .......... 368/121 |

FOREIGN PATENT DOCUMENTS

JP          6-63851        8/1994

\* cited by examiner

*Primary Examiner*—Diego Gutierrez
*Assistant Examiner*—Jeanne-Marguerite Goodwin
(74) *Attorney, Agent, or Firm*—Morrison & Foerster LLP

(57) ABSTRACT

This invention relates to an infrared clinical thermometer having a probe projecting forward from the main thermometer body. The probe is designed to be inserted into an ear canal and detect infrared radiation from a human eardrum in order to measure body temperature. A measurement start switch is located on the upper portion of the rear side of the thermometer main body, substantially in line with the probe. When the measurement start switch is pressed, the probe does not rotate or tilt, allowing a accurate temperature measurement to be obtained. The thermometer also has a display which shows the measurement results after the operation of the measurement start switch. The display is located on the upper portion of the rear side of the main body, so that it can be clearly seen as the thermometer is held by the operator.

4 Claims, 6 Drawing Sheets

US 6,336,742 B2

CLINICAL THERMOMETER FOR RECEIVING INFRARED RADIATION FROM A HUMAN EARDRUM

FIELD OF TEE INVENTION AND RELATED ART

The present invention relates to a clinical thermometer for receiving infrared radiation from a human body, especially from a human eardrum. A thermometer measures the temperature of a human body by inserting a probe into the ear canal.

A conventional thermometer is shown in FIG. 6. A probe 52 extends from the head 51 of the main body 50. When an operator holds the thermometer, the probe 52 is directed forward. In probe 52 are located an infrared sensor and a wave guide for guiding the infrared radiation to the sensor. A power switch 53 and a start switch 54 are located on the front face of the thermometer main body 50.

There are two types of the conventional thermometer described above, with different styles of operation. The first type is used by pushing the power switch, inserting the end of the probe into an ear canal, positioning the probe, and pressing the start switch to start the measurement. The second type can be used two ways. The first way is the same as described above. The second way is to push the power switch 53 and the start switch 54 and then insert the probe into the ear canal to measure the temperature. With both the first and second types of thermometers, the measuring start switch is located on the front face below the probe. Accordingly, when the start switch is pressed, a downward rotating moment is caused at the probe opening. As a result, the position of the probe is altered in the ear canal, and the infrared sensor does not receive infrared radiation directly from the eardrum. There is a possibility that the measurement results will show a lower temperature than the actual body temperature.

SUMMARY OF INVENTION

The first object of the present invention is to solve the abovementioned problem of accurately measuring the temperature in the first type of conventional thermometer or the first mode of operation of the second type of thermometer. The second object of the invention is to locate the start switch so that it may be easily pushed and to locate the display so that it may be easily seen.

DETAILED DESCRIPTION OF THE PREFERRED EMBODIMENTS

Figure 1:
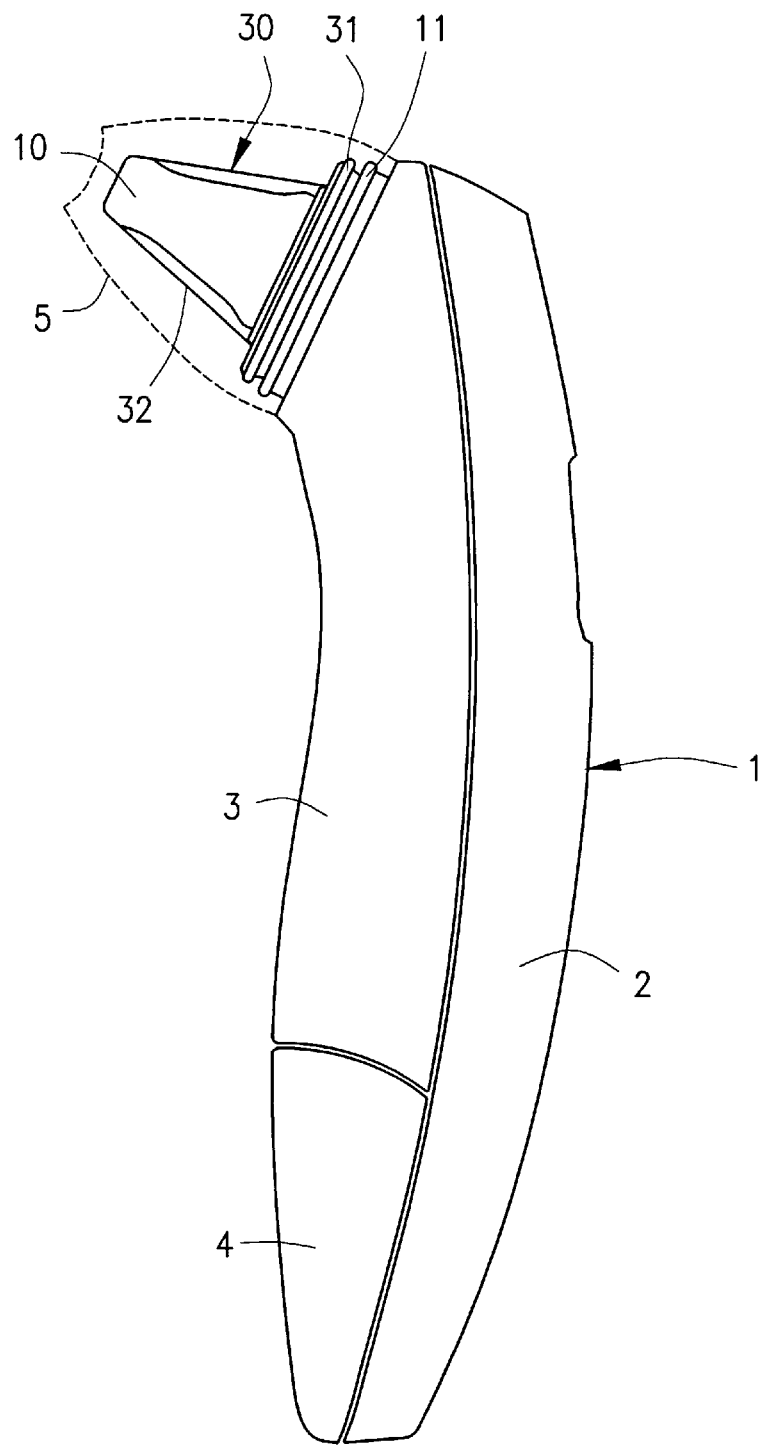
FIG. 1 is a side view of a preferred embodiment of the infrared thermometer.
Figure 2:
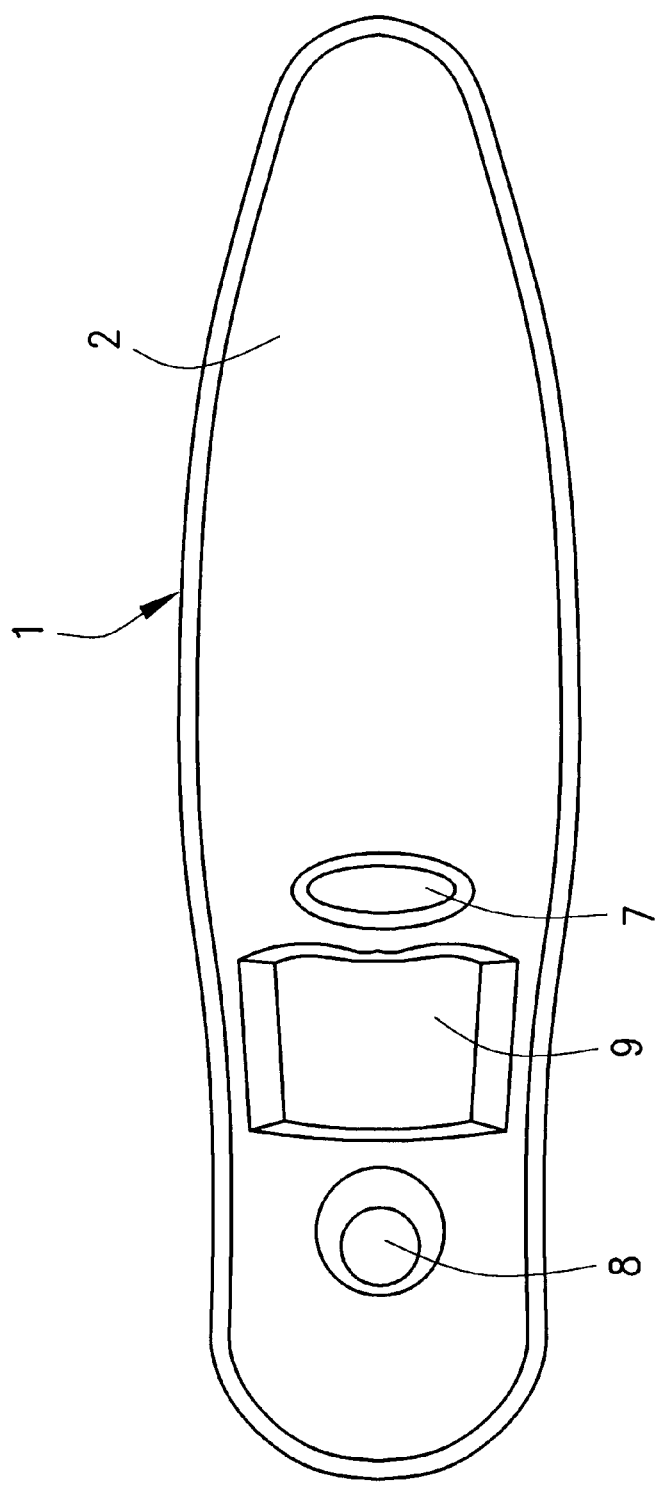
FIG. 2 is a rear view of the preferred embodiment of the thermometer.
Figure 3:
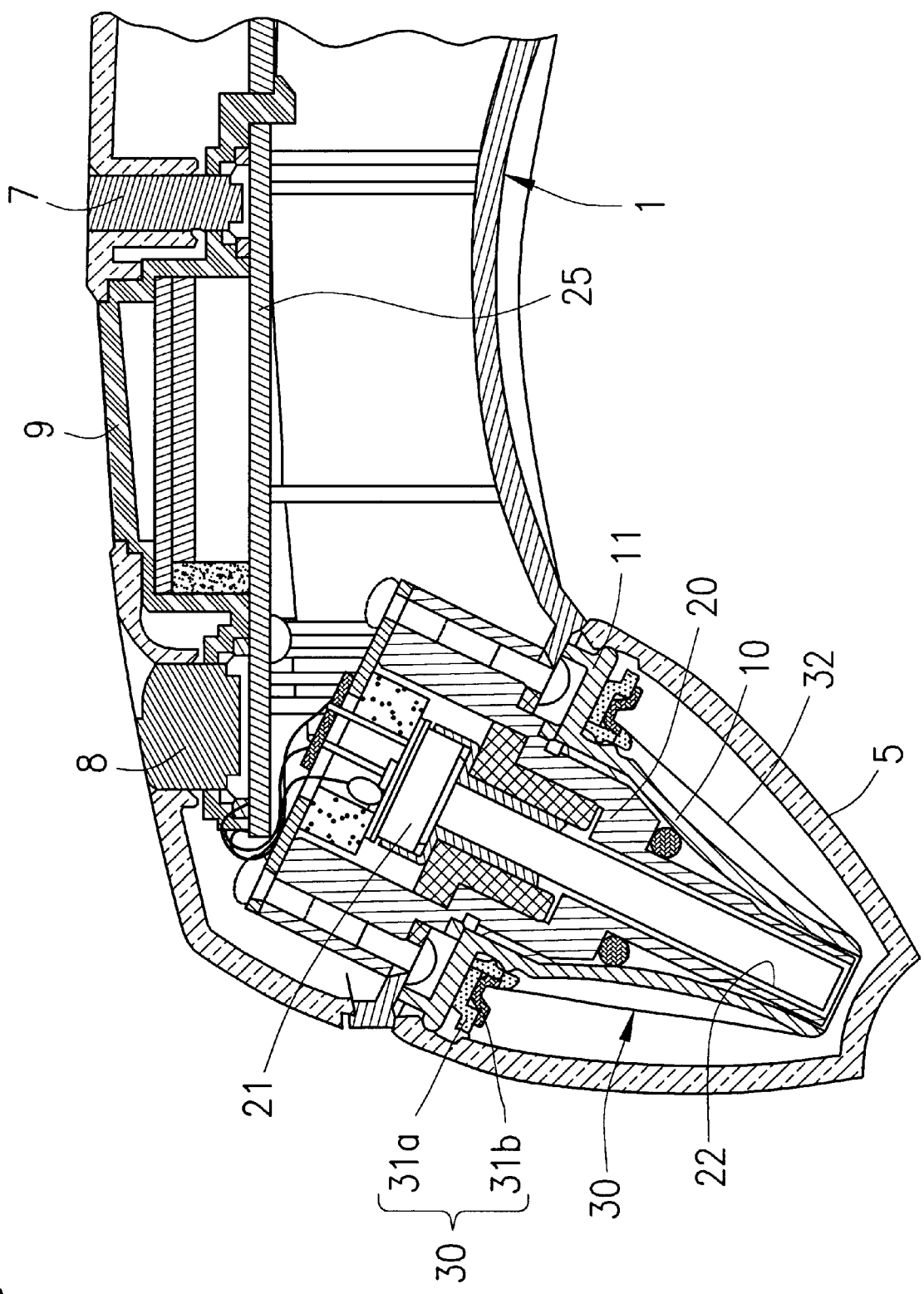
FIG. 3 is a cross-sectional view showing the essential parts of the thermometer.

The thermometer shown in FIG. 1 comprises a main body 1 and a probe 10. The main body 1 consists of a rear housing 2, a front housing 3, and a battery cover 4. The probe 10 projects forward from the main body 1. On the rear side of the main body 1 are a power switch 7. a measuring start switch 8, and a display 9 depicted in FIG. 2 as being located below measuring start switch 8 for displaying measurement results, for example body temperature (FIG. 2). The probe 10 has a flange portion 11 (FIG. 3). When the thermometer is not in use, a cap 5 is attached to the flange portion 11. The cap 5 protects the probe 10. When the thermometer is used, the cap 5 is removed and a probe cover 30 is attached to the probe 10. The probe cover 30 consists of a ring-shaped portion 31 and a transparent film 32 which is attached to the ring portion 31. When a probe cover 30 is attached to the probe 10, the ring portion 31 of the cover attaches to the flange portion 11 of the probe.

As shown in FIG. 3, an inner cylinder 20 is located inside the probe 10. An infrared sensor 21 is located on the base end of the inner cylinder 20. A wave guide 22 for guiding infrared radiation to the sensor 21 attaches to the sensor and extends along the cylinder 20. A circuit board 25 is located in the thermometer main body. The power switch 7, start switch 8, and display 9 are all positioned on the circuit board 25. The sensor 21 is connected to the circuit board 25 by lead wires.

The probe cover 30 consists of a ring portion 31 and a transparent film 32, and the ring portion 31 consists of a lower portion 31a and an upper portion 31b. By attaching the upper portion 31b to the lower portion 31a, the film 32 is sandwiched and fixed between the two portions. When the probe cover 30 is attached to the probe 10, the ring portion 31 contacts to the flange portion 11 of the probe.

Figure 4:
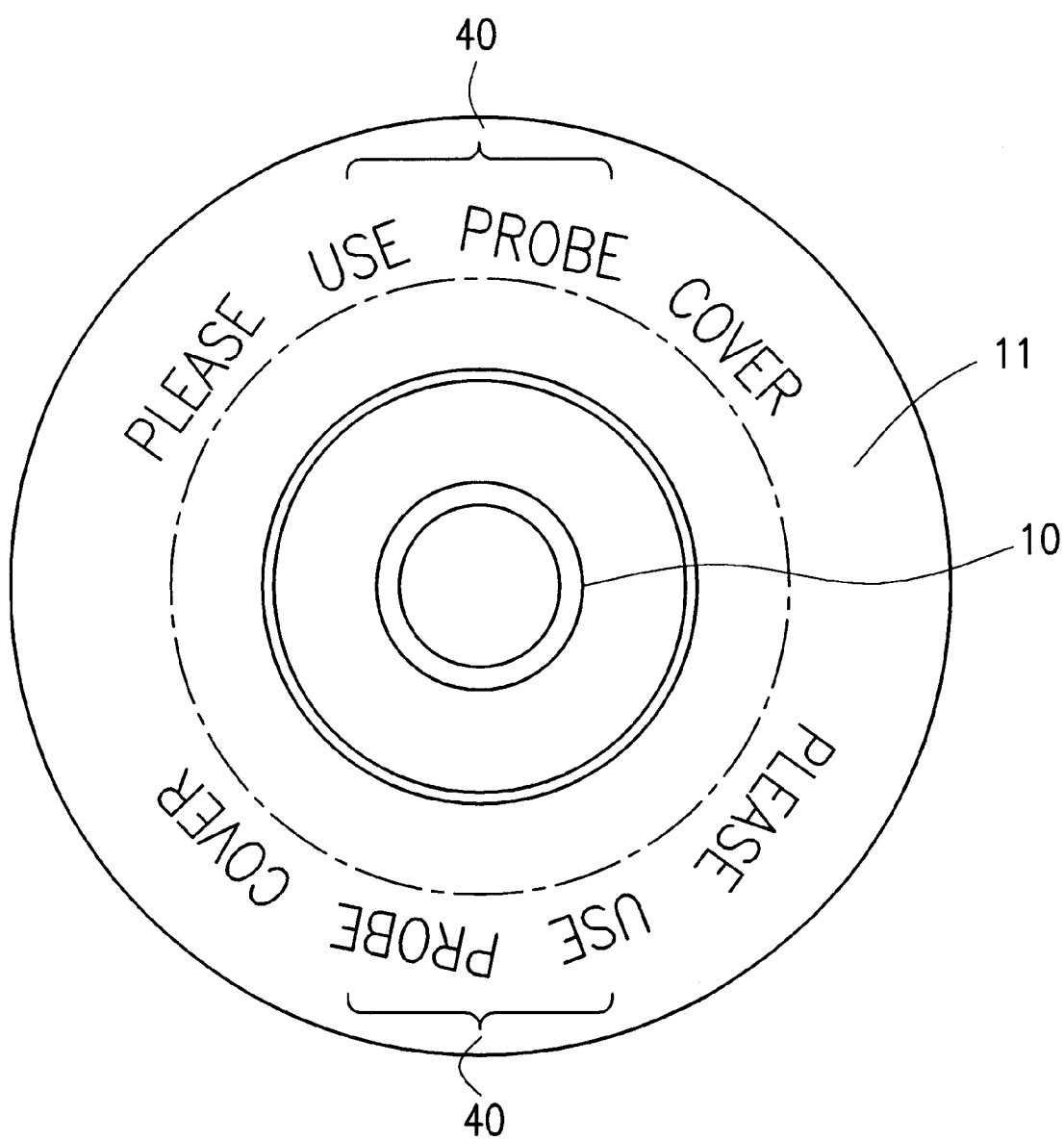
FIG. 4 is a front view of the probe of the thermometer.

In this thermometer, instruction text 40 is printed on the flange portion 11 of the probe 10, as shown in FIG. 4. The instruction text says "Please use probe cover". As shown in FIG. 4, the text is printed on the surface of the flange 11 in two locations. When the probe cover 30 is attached to the probe 10, the text 40 is hidden by the ring portion 31 of the probe cover 30.

The start switch 8 in this thermometer is located on the upper portion of the rear side of the main body 1. The start switch 8 is approximately in line with the axis of the wave guide 22 of the probe 10. When the probe 10, with the probe cover 30 attached, is inserted into the ear canal the start switch is pushed to begin measurement. In this situation, the start switch 8 is depressed in the direction of the probe 10 approximately along its center axis. The end of the probe 10 does not rotate or tilt when the start switch is pushed, and the wave guide 22 remains stable to receive infrared radiation directly from the eardrum. Thus, the accuracy of the measurement is increased. Additionally, when the start switch 8 is pushed, the pushing force inserts the probe more deeply into the ear canal. The probe 10 contacts the ear tightly, so stability and accuracy are increased.

After the start switch is operated, the results of the measurement are displayed on the display 9. The start switch 8 and display 9 are located on the upper portion of the rear side of the main body 1. When the operator grips the main body to use the thermometer, the start switch 8 and display 9 are readily visible. When the end of the probe 10 is inserted into the ear canal, the measurement results can be seen easily on the display.

Figure 5:
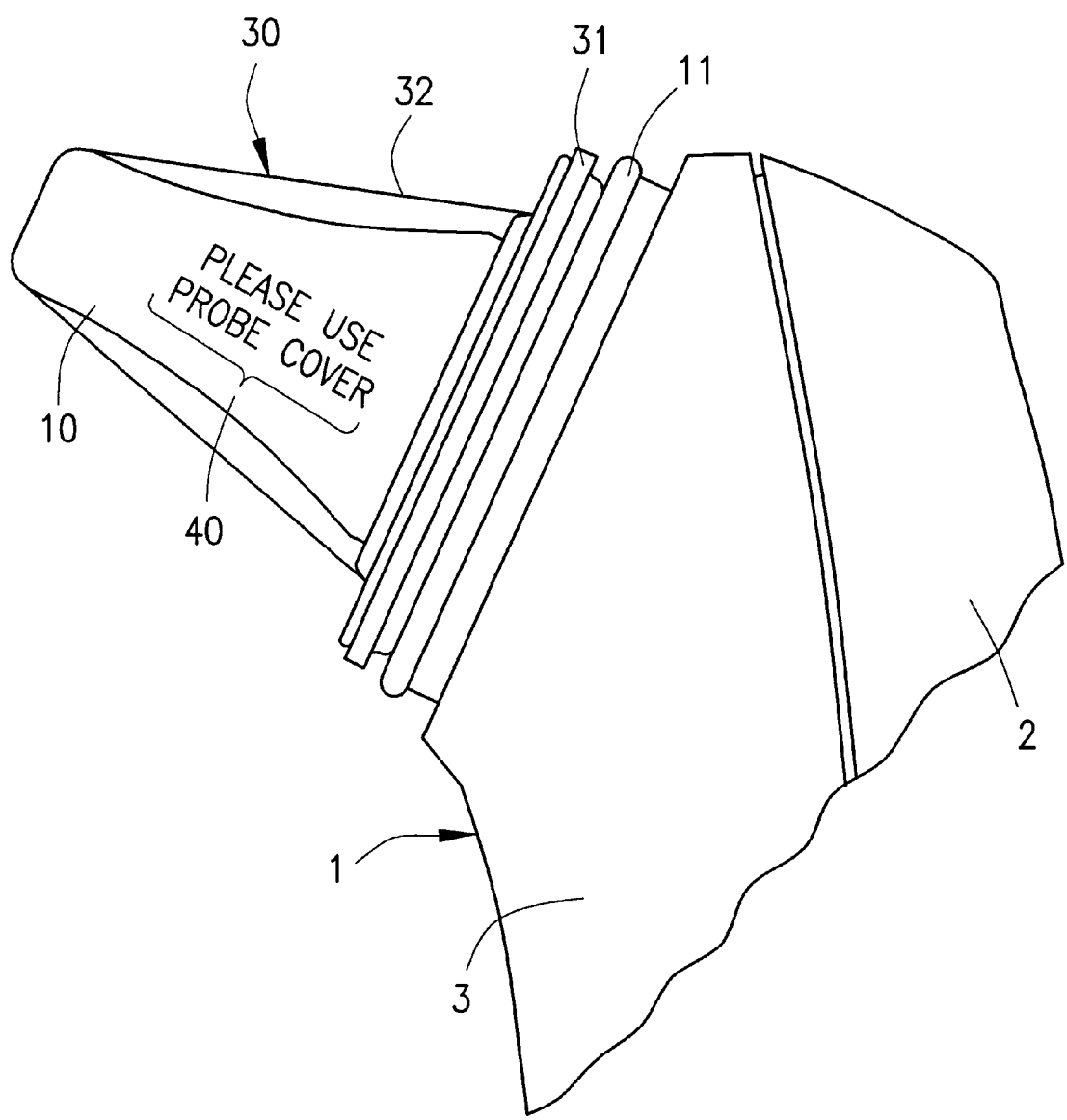
FIG. 5 is a side view of another embodiment of the thermometer probe.
Figure 6:
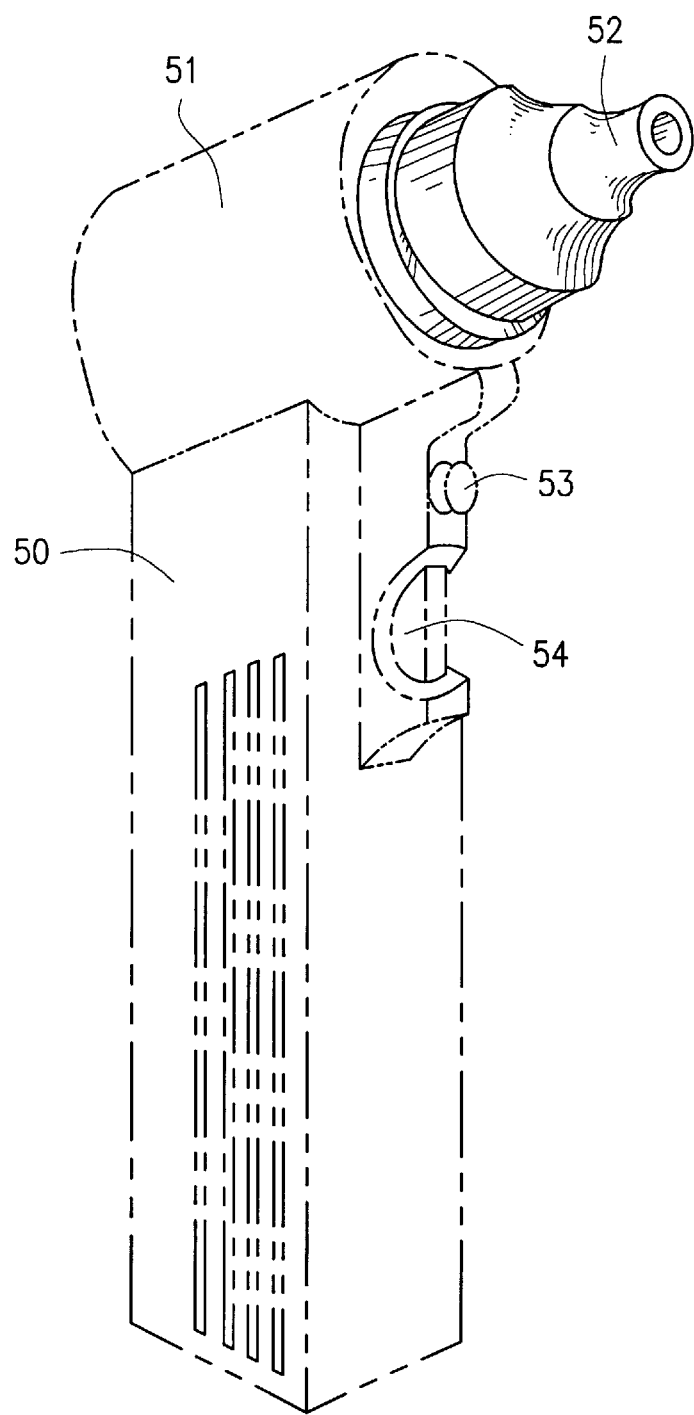
FIG. 6 is a thermometer illustrating the prior art.

Another embodiment is shown in FIG. 5. In this embodiment, the instruction text 40 is printed on the side of the probe 10.

What is claimed is:
1. An infrared clinical thermometer comprising:
    a probe configured for insertion into a human body and having a longitudinal axis, projecting forward from a thermometer main body which is configured to be gripped by a human hand; and a measuring start switch provided on a rear side of the thermometer main body opposite said probe, wherein said measuring start switch is located substantially in line with the longitudinal axis of said probe, so that an end of said probe does not rotate or tilt within the human body when the measuring start switch is depressed.

2. The infrared clinical thermometer of claim 1, further comprising a temperature display located on an upper portion of said rear side of the thermometer main body below said measuring start switch.

3. An infrared clinical thermometer according to claim 1 further comprising:

a probe cover configured to be mounted on said probe, said thermometer bearing an indication thereon directing a user of said thermometer to attach said prove cover to said probe, said indication being located on said thermometer so that said probe cover conceals said indication when said prove cover is mounted on said probe.

4. The infrared clinical thermometer of claim 3, wherein the probe cover comprises a flange on a basal portion of said probe cover and said indication is concealed by said flange.

* * * * *